UNITED STATES PATENT OFFICE 2,516,913

ADDITION PRODUCTS OF ALIPHATIC ACID ESTERS OF ORTHOPHOSPHORIC ACID AND DIALIPHATICAMINOMETHYL PHENOLS

Anthony John Revukas, Cranford, N. J., assignor to Tide Water Associated Oil Company, Bayonne, N. J., a corporation of Delaware No Drawing. Application January 31, 1947,
Serial No. 725,729

16 Claims. (Cl. 260—461)

This invention relates to new chemical compounds adapted for use as demulsifying agents for oils when incorporated therewith and to a process for producing such compounds. More particularly, the invention relates to substituted ammonium compounds formed by certain tertiary amines with certain acid phosphates as more fully described hereinafter.

According to the present invention, the novel group of compounds embodied herein are addition salts of aliphatic acid orthophosphates and dialiphaticaminomethyl phenols, the phenol grouping of which is characterized by containing an aliphatic group substituent for a nuclear hydrogen atom. In broad aspect, the novel compounds embodied herein, adapted for use as demulsifying agents for oils, may be illustrated by the following structural formulas:

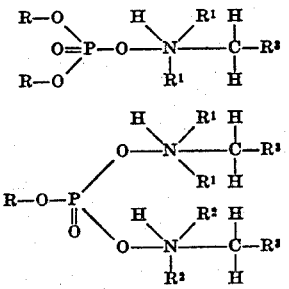

wherein R stands for the same or different aliphatic groups, $R^1$ represents the same or different aliphatic groups, the sum of whose carbon atoms is more than 6, $R^2$ has the same significance as $R^1$, and $R^3$ is the same or different phenol groupings containing an aliphatic substituent for a nuclear hydrogen atom. Depending upon the conditions of preparation, as is more fully discussed hereinafter, compounds of the foregoing formulas may be prepared individually or as mixtures thereof.

In accordance with the invention, the tertiary amines employed in preparing my novel compositions may be illustrated by the following formula:

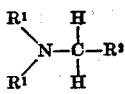

wherein $R^1$ represents the same or different aliphatic radicals containing a sum of at least 7 carbon atoms and $R^2$ is a phenol grouping having at least one nuclear hydrogen atom substituted by an aliphatic radical. As is more fully described hereinafter, the total number of carbon atoms as the sum of the aliphatic radicals represented by the $R^1$ radicals is of considerable importance, as the compounds of the present invention derived from such amines impart excellent and more effective demulsifying properties to oils as compared to similar compounds prepared from similar amines but which contain less than a total of 7 carbon atoms in the corresponding aliphatic groups. Suitable examples of tertiary amines falling within the foregoing formula, which are embodied herein for preparing my novel compounds, include dialkylaminomethyl phenols, e. g., dialkylaminomethyl cardanols, containing a sum of more than 6 carbon atoms in the dialkyl groups. Such dialkylaminomethyl phenols may be prepared by condensation of the phenol with at least one molar equivalent each of formaldehyde and a secondary aliphatic amine. In illustration of methods suitable for preparing the amines contemplated for reaction with the acid phosphates, amines falling within the foregoing structural formula which contain a saturated hydrocarbon chain as a substituent on the phenylol redical may be prepared by the method set forth in U. S. Patent 2,363,134 (McCleary) issued November 21, 1944, and more specifically, in accordance with the procedure in Example I, page 3, column 1, lines 59 to 75 of that patent. Amines falling within the aforesaid structural formula but which contain an unsaturated hydrocarbon chain as a substituent on the phenylol radical, e. g., the dialkylaminomethyl cardanols, may be prepared in accordance with the procedure set forth in my copending application, Serial No. 714,663, (now abandoned) filed December 6, 1946 relating to preparation of diamylaminomethyl cardanol.

With reference to the esters of phosphorus acids that may be suitably employed for reacting with the tertiary amines to provide the novel compounds embodied herein, the present invention comprises use of mono- and di-aliphatic esters of ortho phosphoric acid, as for example, monolauryl-, dilauryl-, dibutyl-, di-2-ethylhexyl acid ortho phosphates, and the like, or mixtures of such esters. In preparing my novel compounds, the tertiary amines are employed in amounts at least sufficient to react with the hydroxyl groups of the phosphate esters to produce the substituted ammonium compounds of the present invention. Thus, depending upon the conditions of preparation, particularly the specific phosphate esters and concentrations thereof employed in relation with the amine, compounds or mixtures of compounds as embodied by the present invention may be provided.

In order to further describe my invention and to illustrate certain embodiments thereof, the following examples are set forth:

EXAMPLE I

*Preparation of cardanylolmethyl diamylammonium di(2-ethylhexyl) orthophosphate*

One mole of di-2-ethylhexyl ortho phosphate and one mole of cardanylolmethyl diamylamine were charged into a flask equipped with a mechanical stirrer and a thermometer, the proportion of reactants comprising the theoretical amount of amine sufficient to react with the hydroxyl group of the phosphate ester to form the substituted ammonium compound.

Upon charging, the contents of the flask were at 26° C. The charge was agitated and the temperature increased spontaneously to 42° C. Agitation was continued until the temperature of the charge dropped to 30° C. The product resulting from the foregoing exothermic reaction is a highly viscous, oily, orange-colored liquid soluble in precipitation naphtha, benzene, methyl ethyl ketone, isopropyl alcohol, and butanol, and insoluble in methanol or ethanol. The reaction product has a pH of about 5 to 5.5, hydrolyzes slightly in the presence of water yielding an acid reaction, has a specific gravity of 0.9637 at 20°/20° C. and is not readily distillable without decomposition. Phosphorus determinations on the reaction product gave experimental values of 3.79 and 3.70%, the theoretical value being 3.90%.

The product of the foregoing reaction is cardanylolmethyl diamylammonium di - (2 - ethylhexyl) orthophosphate having the following formula:

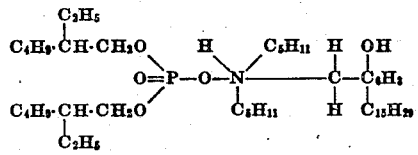

This substance, when incorporated in minor proportions into an oil having a tendency to emulsify with water, imparted excellent demulsifying characteristics thereto as is more fully described hereinafter.

EXAMPLE II

*Preparation of a mixture of bis-(cardanylolmethyl-diamylammonium) monolauryl orthophosphate and cardanylolmethyl diamylammonium dilauryl orthophosphate.*

The reactants employed consisted of cardanylolmethyl diamylamine and a commercial grade of lauryl orthophosphoric acids containing about two parts by weight of dilauryl orthophosphoric acid and one part by weight of monolauryl orthophosphoric acid.

The reactants, in the ratio of 0.065 mole of cardanylolmethyl diamylamine and 0.043 mole of the foregoing phosphate mixture, were charged into a flask equipped with a stirrer and a thermometer. The proportions of reactants employed were the theoretical amount of amine sufficient to react with all of the hydroxyl groups of the phosphates to form substituted ammonium compounds therewith.

The temperature of the reactants was 24° C. when charged and increased spontaneously to 40° C. when they were mixed. Agitation was continued until the temperature dropped to 30° C.

The product resulting from the foregoing exothermic reaction is a highly viscous, translucent, dark wine-red colored water-insoluble liquid. The reaction product is soluble in oil, aromatic and aliphatic hydrocarbons, methyl ethyl ketone, isopropanol and butanol, insoluble in methanol or 95% ethanol, has a pH of about 5.5 to 6.0, hydrolyzes slightly with water to yield an acid reaction, has a density of 0.9570 at 20° C. and due to thermal instability at about 160° C. is not readily distillable. Phosphorus determinations on the reaction product gave experimental values of 2.89 and 2.87%, the theoretical value being 2.97%.

The product of the foregoing reaction was a mixture of compounds of the following formulas in proportion of about 56% by weight of Formula A and 44% of Formula B.

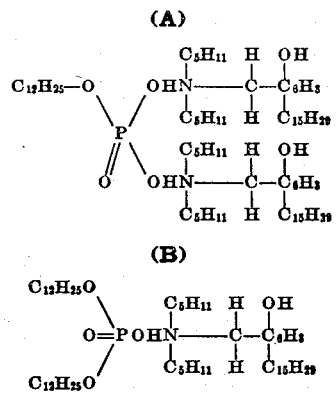

The foregoing reaction product, when incorporated in minor proportions in an oil having a tendency to emulsify with water, imparted excellent demulsifying properties thereto as is more fully described hereinafter.

In a manner similar to the foregoing examples, dibutyl acid orthophosphate was reacted with diamylaminomethyl cardanol to provide a reaction product having the following formula which was also found to impart effective demulsifying properties to oils:

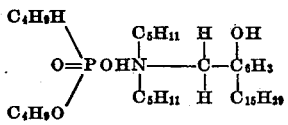

As stated hereinbefore, the novel compounds embodied by the present invention are effective demulsifiers for oils, as for example, mineral oils and fractions thereof including Diesel fuels, lubricating oils, hydraulic oils, and the like, that have emulsified due to the presence of water therein. Furthermore, the novel compounds are effective addition agents for suppressing emulsification of oils that have a tendency to emulsify when such oils are subjected to conditions whereby they become contaminated with water. For such purposes, the novel compounds may be employed per se, in mixtures thereof, or as solutions or dispersions in suitable vehicles, as for example, mineral oils. In order to illustrate the effective demulsifying characteristics imparted to oils by incorporating my novel compounds therein, several test results are shown in Table I set forth hereinafter. In determining demulsifying characteristics, the test compositions in the table were prepared and tested in accordance with the following Procedure A. Test Numbers 3 and 4, containing a demulsifying agent, were prepared in the same manner as Test Numbers 1 and 2, except that in Test Numbers 3 and 4, the demulsifying additive was incorporated into the oil prior to admixture thereof with distilled water or salt solution.

Test Procedure A

The apparatus employed comprises a motor-driven mixer, a 100 ml. graduate, and a constant temperature bath.

Eighty ml. of the test composition consisting of 40 ml. of test oil and 40 ml. of distilled water, or 1% aqueous salt solution, are poured into the graduate and the test composition heated to a temperature of about 130° F. The test composition is then stirred for 5 minutes at 1500 revolutions per minute while maintaining the 130° F. temperature whereby the composition is emulsified. After the 5-minute stirring is completed, the emulsified composition is maintained at 130° F. without additional agitation. The test composition is observed at 5-minute intervals up to a 60-minute period. At each interval, it is noted whether the emulsion has been completely separated into a layer of water and a layer of oil, or whether an oil-water emulsion is still present. If the emulsion has not been completely broken, the amount that is present is recorded as "milliliters of cuff," by direct reading on the graduate, at 30 minute and 60 minute readings. When emulsion is present, the test composition comprises a bottom layer of water, a top layer of oil and an intermediate layer of emulsion which is recorded as "milliliters of cuff."

admixed with salt solution or distilled water respectively. However, when the test composition contained a minor amount of cardanylolmethyl diamylammonium di-(2-ethylhexyl) orthophosphate (the reaction product of Example 1), the test composition demulsified in 20 minutes, demonstrating the effectiveness of the demulsifier.

As described hereinbefore, the tertiary amines, as illustrated by the following formula, employed in preparing my novel compounds contain a sum of more than 6 carbon atoms in the aliphatic groups represented by $R^1$:

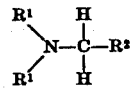

wherein $R^2$ is a phenol grouping having at least one nuclear hydrogen atom substituted by an aliphatic radical. The presence of at least 7 carbon atoms as a sum for the aliphatic groups is particularly important in preparing my novel compounds as use of such amines provides reaction products of the present invention having excellent demulsifying characteristics for oils. This aspect of the present invention is illustrated by the data shown in Table II. The data sets forth the ineffective demulsification obtained on the certain oils tested when the additive was provided by reacting aliphatic acid orthophosphates with amines of the foregoing structural formula but in which the sum of carbon atoms in the aliphatic groups ($R^1$) is less than 7, as compared to the effective demulsification provided by use of similar products obtained by reacting the same orthophosphates with amines of the foregoing

TABLE I

| Test No. | Test Composition, Equal Parts by Volume | Additive | Per Cent by Weight of Additive Based on Weight of Oil | Results Employing Procedure A, 60-Minute Reading |
|---|---|---|---|---|
| 1 | Turbine Lubricating Oil and Salt Solution. | None | None | 12 ml. of cuff. |
| 2 | Turbine Lubricating Oil and Distilled Water. | ___do___ | None | 8 ml. of cuff. |
| 3 | Same as Test No. 1 | Reaction Product of Example I. | 0.05 | Complete resolution in 20 minutes. |
| 4 | Same as Test No. 2 | ___do___ | 0.05 | Do. |

With reference to the foregoing examples, Test Numbers 1 and 2 show that the lubricating oil employed emulsified when tested in accordance with Test Procedure A in that out of the original 80 ml. of test composition, 12 ml. and 8 ml. of emulsion were present after 60 minutes when structural formula containing at least 7 carbon atoms as the sum of aliphatic groups ($R^1$). In determining demulsifying characteristics for the test compositions of Table II, the procedure and conditions employed were the same as those previously described with reference to Table I.

TABLE II

| Test No. | Test Composition, Equal Parts by Volume | Additive | Per cent by Weight of Additives Based on Weight of Oil | Results Employing Procedure A, 30-Minute Reading |
|---|---|---|---|---|
| 5 | Turbine Lubricating Oil and Distilled Water | None | None | 8 ml. of cuff. |
| 6 | Same as Test No. 5 | Reaction product of Example II | 0.04 | Complete resolution in 26 minutes. |
| 7 | ___do___ | Same as Reaction Product of Example II except that dimethylaminomethyl cardanol was reacted with the phosphate esters instead of diamylaminomethyl cardanol. | 0.04 | 51 ml. of cuff. |
| 8 | ___do___ | Same as Reaction Product of Example II except that diethylaminomethyl cardanol was reacted with the phosphate esters instead of diamylaminomethyl cardanol. | 0.04 | 18 ml of cuff. |
| 9 | ___do___ | Same as Reaction Product of Example II except that diisopropylaminomethyl cardanol was reacted with the phosphate esters instead of diamylaminomethyl cardanol. | 0.04 | 8 ml. of cuff. |

With reference to Table II, Test Number 5 demonstrates that the turbine lubricating oil employed emulsified when admixed with water and tested in accordance with Procedure A, in that 8 ml. of emulsion were present out of the original 80 ml. of test composition after 30 minutes. Test Number 6 illustrates that when the same test composition contained a minor amount of a mixture of my novel compounds, e. g., as prepared in Example II wherein the aliphatic groups of the amine employed contained a sum of more than 6 carbon atoms, the composition was completely demulsified in 26 minutes. Furthermore, Test Numbers 7, 8 and 9 show the ineffective demulsification provided on the test composition when amines containing less than 7 carbon atoms in the aliphatic groups, as discussed hereinbefore, were employed in preparing the additive compounds. In each case wherein the compounds were prepared by use of amines in which the aliphatic groups as represented by $R^1$ were dimethyl, diethyl or diisopropyl, the test compositions treated therewith were not imparted with demulsifying properties but emulsification was actually enhanced in Test Numbers 7 and 8 as is evidenced by the presence of 51 ml. and 18 ml. of emulsion as compared with the same basic test composition of Test Number 5 which did not contain an additive and had 8 ml. of emulsion at the corresponding reading after 30 minutes.

In the foregoing description of the adaptability of my novel compounds as demulsifiers for oils, the test data sets forth the demulsifying characteristics imparted by such compounds or mixtures thereof to oils of the lubricating grade. Similarly, the use of my novel compounds in mineral oil fractions other than those of lubricating grade also impart effective demulsifying properties thereto. For example, addition of my novel compounds to oils of the Diesel fuel grade have been found to impart demulsifying characteristics. In addition to the demulsifying characteristics imparted to oil compositions, use of certain of the novel compounds in oils imparts highly effective rust-inhibiting properties thereto, such rust-inhibiting properties being highly desirable, particularly for lubricating oils, Diesel fuels and the like, which are subjected under operating conditions to admixture with water and come into contact with rust-forming materials such as ferrous metals. Thus, for example, the use of a minor proportion of mixture of bis-(cardanylolmethyl diamylammonium) monolauryl orthophosphate and cardanylolmethyl diamylammonium dilauryl orthophosphate in oils has been found to impart rust-inhibiting properties thereto as well as excellent demulsifying characteristics.

In the foregoing descriptions of my invention, illustrations have been set forth showing the effectiveness of my novel compounds as demulsification agents for oils having a tendency to emulsify with water. In a similar manner, effective demulsification properties are imparted to oils containing certain additives which induce emulsification. For example, oil-soluble polymerized esters of the acrylic series are known to be valuable additives for oils to impart certain desired characteristics thereto, as for example, to depress the pour point, to improve viscosity index, to maintain lubricating surfaces free of undesirable gum or other deposits, and the like. However, although the use of such additives in oils imparts certain desirable properties thereto, under certain conditions, as for example, wherein water or steam can come into contact with the additive-containing oils, the polymerized esters of the acrylic series tend to induce emulsification, thus interfering with the performance efficiency of the oil compositions. The emulsification tendency imparted to oils by such additives is materially suppressed by incorporating the compounds as embodied herein into such oil compositions as is more fully described in my application, Serial No. 736,418 filed March 21, 1947. Thus, for example, the use of a minor proportion of a mixture of bis-(cardanylolmethyl diamylammonium) monolauryl orthophosphate and cardanylolmethyl diamylammonium dilauryl orthophosphate in a composition comprising an oil and a polymeric ester of the acrylic series has been found to not only effectively suppress the emulsification enhancing properties of the ester, but also imparts excellent rust-inhibiting characteristics to the polymer-containing oil composition.

Although the present invention has been described in conjunction with certain preferred embodiments thereof, those skilled in the art will readily recognize that variations and modifications can be made. Such modifications and variations are to be considered to be within the purview of the specification and scope of the appended claims.

I claim:

1. Cardanylolmethyl diamylammonium di-(2-ethylhexyl) orthophosphate.

2. As a new chemical compound, a substituted ammonium salt formed by an alkyl acid ester of orthophosphoric acid with an amine of the following formula:

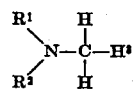

wherein $R^1$ and $R^2$ are alkyl radicals, the sum of the carbon atoms in $R^1$ plus $R^2$ being more than six, and $R^3$ is a hydrocarbon-substituted phenylol radical.

3. A salt, as defined in claim 2, wherein the acid ester is a dialkyl acid ester of orthophosphoric acid.

4. A salt, as defined in claim 2, wherein the acid ester is a monoalkyl acid ester of orthophosphoric acid.

5. A salt, as defined in claim 2, wherein $R^3$ is a phenylol radical containing a long chain hydrocarbon radical as a substituent for a nuclear hydrogen atom.

6. As a new composition, a substituted ammonium salt (a) formed by a dialkyl acid ester of orthophosphoric acid with an amine of the following formula:

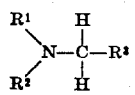

wherein $R^1$ and $R^2$ are alkyl radicals, the sum of the carbon atoms in $R^1$ plus $R^2$ being more than six, and $R^3$ is a hydrocarbon-substituted phenylol radical, in admixture with (b) a substituted ammonium salt formed by a monoalkyl acid ester of orthophosphoric acid with an amine of the aforesaid formula.

7. As a new chemical compound, a substituted ammonium salt formed by an alkyl acid ester of orthophosphoric acid with a dialkylaminomethyl cardanol containing a sum of more than six carbon atoms in the dialkyl grouping.

8. As a new composition of matter, bis-(cardanylolmethyl-diamylammonium) monolauryl orthophosphate in admixture with cardanylolmethyl diamylammonium dilauryl orthophosphate.

9. A method for preparing a substituted ammonium salt as defined in claim 2 which comprises subjecting an alkyl acid ester of orthophosphoric acid to addition reaction with an amine of the following formula:

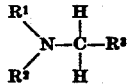

wherein $R^1$ and $R^2$ are alkyl radicals, the sum of the carbon atoms in $R^1$ plus $R^2$ being more than six, and $R^3$ is a hydrocarbon-substituted phenylol radical.

10. A method, as defined in claim 9, wherein the acid ester is a dialkyl acid ester of orthophosphoric acid.

11. A method, as defined in claim 9, wherein the acid ester is a monoalkyl acid ester of orthophosphoric acid.

12. A method, as defined in claim 9, wherein $R^3$ is a phenylol radical containing a long chain hydrocarbon radical as a substituent for a nuclear hydrogen atom.

13. A method for preparing a composition as defined in claim 6 which comprises subjecting a mixture of monoalkyl- and di-alkyl acid esters of orthophosphoric acid to addition reaction with an amine of the following formula:

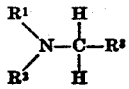

wherein $R^1$ and $R^2$ are alkyl radicals, the sum of the carbon atoms in $R^1$ plus $R^2$ being more than six, and $R^3$ is a hydrocarbon-substituted phenylol radical.

14. A method for preparing a composition as defined in claim 7 which comprises subjecting an alkyl acid ester of orthophosphoric acid to addition reaction with a dialkylaminomethyl cardanol, said dialkylaminomethyl cardanol being characterized by containing a sum of more than six carbon atoms in the dialkyl grouping.

15. A method for preparing a composition as defined in claim 8 which comprises subjecting a mixture of monolauryl acid phosphate and dilauryl- acid phosphate to addition reaction with diamylaminomethyl cardanol.

16. A method for preparing cardanylolmethyl diamylammonium di-(2-ethyl hexyl) orthophosphate which comprises subjecting di-2-ethyl hexyl orthophosphate to addition reaction with cardanylolmethyl diamylamine in an amount sufficient to neutralize said di-2-ethyl hexyl orthophosphate.

ANTHONY JOHN REVUKAS.

REFERENCES CITED

The following references are of record in the file of this patent:

UNITED STATES PATENTS

| Number | Name | Date |
| --- | --- | --- |
| 2,256,380 | Dickey | Sept. 16, 1941 |
| 2,318,296 | Dickey | May 4, 1943 |
| 2,345,388 | Ericks et al. | Mar. 28, 1944 |
| 2,387,537 | Smith et al. | Oct. 23, 1945 |
| 2,387,538 | Smith et al. | Oct. 23, 1945 |
| 2,397,381 | Smith et al. | Mar. 26, 1946 |

Certificate of Correction

Patent No. 2,516,913

August 1, 1950

ANTHONY JOHN REVUKAS

It is hereby certified that error appears in the printed specification of the above numbered patent requiring correction as follows:

Column 2, line 25, for "redical" read *radical*; column 4, line 51, for that portion of the formula reading "$C_4H_9H$" read $C_4H_9O$; column 7, lines 62 and 63, for "demulsifification" read *demulsification*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*